(12) United States Patent
Craft (10) Patent No.: US 11,390,928 B2
(45) Date of Patent: Jul. 19, 2022

(54) INDUCING COMPRESSIVE STRESS WITH SHOT PEEN ELEMENTS IN INTERNAL OPENING OF ADDITIVELY MANUFACTURED COMPONENT

(71) Applicant: GENERAL ELECTRIC COMPANY, Schenectady, NY (US)

(72) Inventor: Tiffany Muller Craft, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 15/911,618

(22) Filed: Mar. 5, 2018

(65) Prior Publication Data

US 2019/0271050 A1    Sep. 5, 2019

(51) Int. Cl.
*C21D 7/06* (2006.01)
*B22F 3/24* (2006.01)
(Continued)

(52) U.S. Cl.
CPC .................. *C21D 7/06* (2013.01); *B22F 3/24* (2013.01); *B22F 5/04* (2013.01); *B22F 5/10* (2013.01);
(Continued)

(58) Field of Classification Search
CPC ...... C21D 7/06; C21D 2221/00; B21D 31/06; B24C 1/10; B24C 3/325; B24C 5/005; B33Y 80/00; B33Y 40/20; B33Y 10/00; B33Y 30/00; B33Y 40/00; B29C 64/188; B29C 64/153; B29C 64/35; B22F 3/24; B22F 5/10; B22F 2202/01; B22F 3/168; B22F 5/04; B22F 2003/1058; B22F 2999/00; B22F 3/1055
See application file for complete search history.

(56) References Cited

U.S. PATENT DOCUMENTS

| | | | |
|---|---|---|---|
| 9,889,539 B1* | 2/2018 | Schurb | ...................... C21D 7/04 |
| 2014/0034626 A1* | 2/2014 | Illston | .................... B23K 26/34 |
| | | | 219/121.78 |

(Continued)

FOREIGN PATENT DOCUMENTS

| | | |
|---|---|---|
| WO | 2016199959 A1 | 12/2016 |
| WO | 2017142882 A1 | 8/2017 |

*Primary Examiner* — Gregory D Swiatocha
(74) *Attorney, Agent, or Firm* — James Pemrick; Hoffman Warnick LLC (57) ABSTRACT

The disclosure relates to inducing compressive stress with shot peen elements in an internal opening of an additively manufactured component. Methods according to the disclosure include: receiving a component made by a metal powder additive manufacturing process, the component including a body having an external surface and an internal opening passing at least partially through the body, the internal opening including an additively manufactured shot peen element detached from a surface of the internal opening, wherein the additively manufactured shot peen element is shaped to induce a residual compressive stress upon contact with the surface of the internal opening; and vibrating the component at a selected frequency, wherein the additively manufactured shot peen element induces the compressive stress against the surface of the internal opening during the vibrating.

17 Claims, 9 Drawing Sheets

(51) Int. Cl.
*B22F 5/10* (2006.01)
*B33Y 80/00* (2015.01)
*B29C 64/188* (2017.01)
*B33Y 10/00* (2015.01)
*B22F 5/04* (2006.01)
*B29C 64/153* (2017.01)
*B29C 64/35* (2017.01)

(52) U.S. Cl.
CPC ............ *B29C 64/188* (2017.08); *B33Y 10/00* (2014.12); *B22F 2202/01* (2013.01); *B29C 64/153* (2017.08); *B29C 64/35* (2017.08); *B33Y 80/00* (2014.12); *C21D 2221/00* (2013.01)

(56) References Cited

U.S. PATENT DOCUMENTS

| | | | |
|---|---|---|---|
| 2014/0101938 A1* | 4/2014 | Huxol | B23P 6/007 29/889 |
| 2015/0093279 A1* | 4/2015 | Kington | C22C 1/0491 419/19 |
| 2016/0175986 A1* | 6/2016 | Etter | C22C 1/0433 148/522 |
| 2016/0228929 A1* | 8/2016 | Williamson | B22F 10/00 |
| 2020/0094326 A1* | 3/2020 | Oswald | B23K 15/0086 |

* cited by examiner

INDUCING COMPRESSIVE STRESS WITH SHOT PEEN ELEMENTS IN INTERNAL OPENING OF ADDITIVELY MANUFACTURED COMPONENT

BACKGROUND

The disclosure relates generally to stress relief in metal components, and more particularly, to methods of inducing compressive stress within an internal opening of an additively manufactured component, and additively manufactured components configured for inducement of compressive stress within internal openings thereof.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high power melting beam, such as a 100 Watt ytterbium laser, to fully weld (melt) the metal powder to form a solid metal. The melting beam is moved or deflected in the X-Y direction, and has an intensity sufficient to fully weld (melt) the metal powder to form a solid metal. The metal powder bed may be lowered for each subsequent two dimensional layer, and the process repeats until the component is completely formed.

Use of certain materials creates challenges for metal powder additive manufacturing. For example, gamma prime hardened superalloys (e.g., nickel-based) are advantageous materials to produce components using DMLM. "Gamma prime" is a coherently precipitating phase in which there is a close match in matrix/precipitate lattice, resulting in a material having a long-duration stability. After manufacturing, the additively manufactured components using such materials may be exposed to a stress relief heat treatment during which the components or portions thereof may experience macro-cracking caused by high residual surface stresses in the component. This phenomenon may be referred to as strain age cracking (SAC). A potential mechanism to mitigate SAC includes shot peening applied to an external surface of the component to prevent macro-cracking in the external surface, i.e., to introduce compressive stress to compensate for a high residual tensile surface stress. With increased component complexity, especially with intricate internal features like near wall cooling passages, the effectiveness of shot peening is limited because it is only applicable to an external surface of the component, not internal openings. Consequently, certain applications for a component using gamma prime hardened superalloys having complex internal geometries are not feasible.

SUMMARY

A first aspect of the disclosure provides a method including: receiving a component made by a metal powder additive manufacturing process, the component including a body having an external surface and an internal opening passing at least partially through the body, the internal opening including an additively manufactured shot peen element detached from a surface of the internal opening, wherein the additively manufactured shot peen element is shaped to induce a residual compressive stress upon contact with the surface of the internal opening; and vibrating the component at a selected frequency, wherein the additively manufactured shot peen element induces the compressive stress against the surface of the internal opening during the vibrating.

A second aspect of the disclosure provides a method including: receiving a component made by a metal powder additive manufacturing process, the component including: a body having an external surface, an internal opening passing at least partially through the body, and an additively manufactured shot peen element having at least one ligament mechanically coupled to a surface of the internal opening, wherein the additively manufactured shot peen element is shaped to induce a residual compressive stress upon contact with the surface of the internal opening; breaking the at least one ligament to detach the additively manufactured shot peen element from the surface of the internal opening; and vibrating the component at a selected frequency, wherein the additively manufactured shot peen element induces the compressive stress against the surface of the internal opening during the vibrating.

A third aspect of the disclosure provides an additively manufactured (AM) component made by a metal powder additive manufacturing process, the AM component including: a body having an external surface; an internal opening passing at least partially through the body; at least one ligament mechanically coupled to a surface of the internal opening; and an additively manufactured shot peen element positioned within the internal opening and detached from the surface of the internal opening, wherein the additively manufactured shot peen element is shaped to induce a residual compressive stress upon contact with the surface of the internal opening.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides methods for converting a residual surface stress in a component made by a metal powder additive manufacturing process. The component includes a body having an external surface and an internal opening passing at least partially through the body, the internal opening including an unused metal powder from the additive manufacturing process therein. Residual surface stress is converted in at least a portion of a body about the internal opening by applying a pressure in the internal opening using shot peen elements formed within the internal opening. The shot peen elements of the internal opening may be formed from the same metal powder used to form a remainder of the component. According to further embodiments, the shot peen elements within the internal opening may be formed from different metals and/or other materials from those used to form the additively manufactured component itself. The method is advantageous for use with gamma primed hardened superalloys. An additively manufactured component including the stress-converted internal opening is also disclosed.

Figure 1:
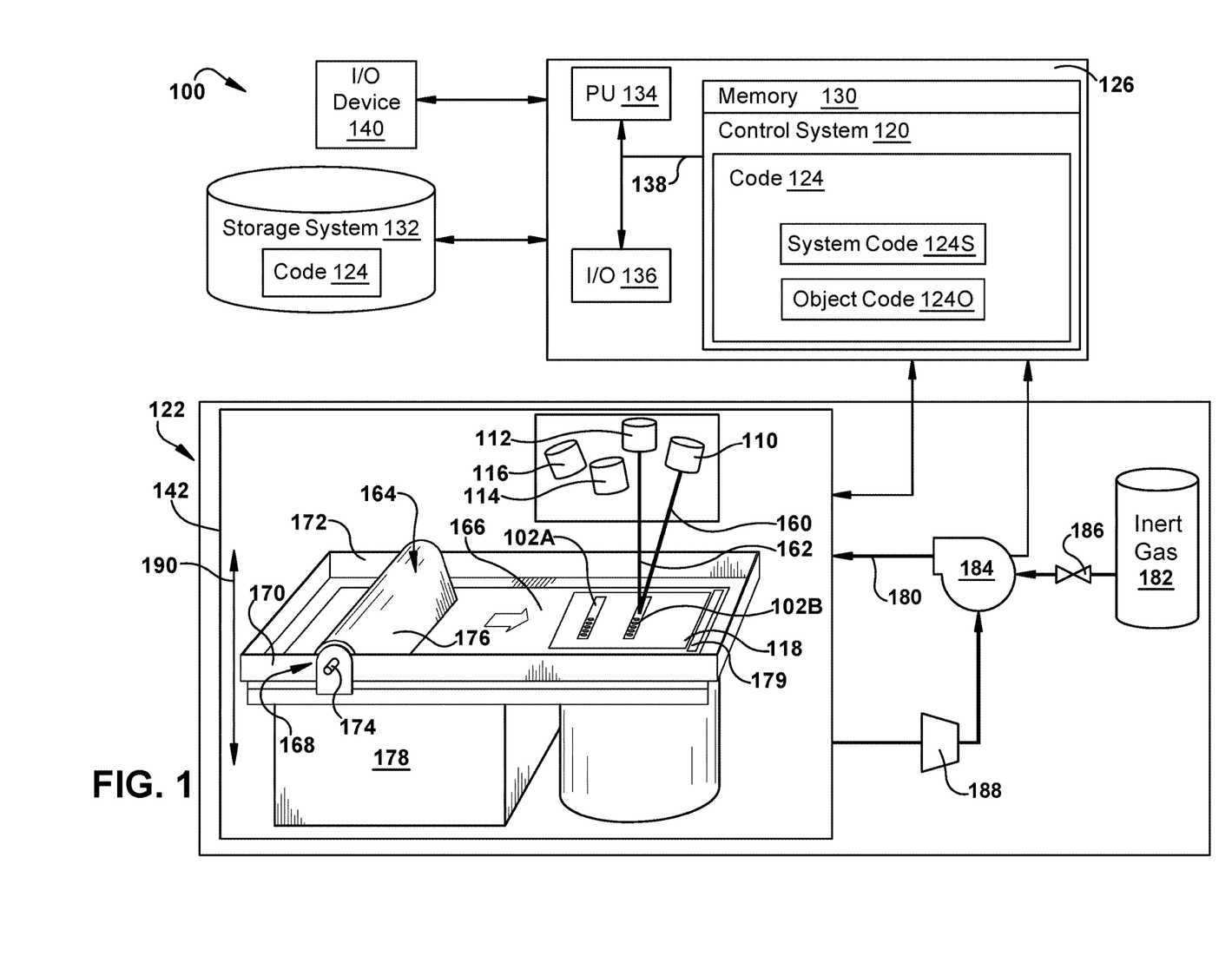
FIG. 1 shows a block diagram of an additive manufacturing system and process including a non-transitory computer readable storage medium storing code representative of a component according to embodiments of the disclosure.

FIG. 1 shows a schematic/block view of an illustrative computerized metal powder additive manufacturing system 100 (hereinafter 'AM system 100') for initially generating additively manufactured (AM) component(s) 102, separately labeled as 102A and 102B in FIG. 1. AM component 102 may include one large AM component or multiple AM components, e.g., two AM components 102A, 102B as shown, of which only a single layer is shown. The teachings of the disclosure may be applied to AM component(s) 102 built using AM system 100. AM system 100 uses multiple melting beam sources, e.g., four lasers 110, 112, 114, 116, but it is emphasized and will be readily recognized that the teachings of the disclosure are equally applicable to build multiple AM components 102 or a single AM component 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 1 as rectangular elements; however, it is understood that the additive manufacturing process can be readily adapted to manufacture any shaped AM component, a large variety of AM components and a large number of AM components having internal openings and formed on a build platform 118.

AM system 100 generally includes a metal powder additive manufacturing control system 120 ("control system") and an AM printer 122. As will be described, control system 120 executes set of computer-executable instructions or program code 124 to generate AM component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126

(e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM component(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122.

Object code 124O defining AM component(s) 102 may include a precisely defined 3D model of an AM component and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 124O representative of AM component(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing AM component(s) 102 into a series of thin slices that assembles using AM printer 122 in successive layers of material.

AM printer 122 may include a processing chamber 142 that is sealed to provide a controlled atmosphere for AM component(s) 102 printing, e.g., a set pressure and temperature for lasers, or a vacuum for electron beam melting. Build platform 118, upon which AM component(s) 102 is/are built, is positioned within processing chamber 142. A number of melting beam sources 110, 112, 114, 116 are configured to melt layers of metal powder on build platform 118 to generate AM component(s) 102. While four melting beam sources 110, 112, 114, 116 will be described herein, it is emphasized that the teachings of the disclosure are applicable to a system employing any number of sources, e.g., 1, 2, 3, or 5 or more.

Continuing with FIG. 1, an applicator 164 may create a thin layer of raw material 166 spread out as the blank canvas from which each successive slice of the final AM component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 may take a variety of forms. In one embodiment, applicator 164 may include a member 176 configured to move along opposing rails 170, 172, and an actuator element (not shown in FIG. 1) in the form of a tip, blade or brush configured to spread metal powder evenly over build platform 118, i.e., build platform 118 or a previously formed layer of AM component(s) 102, to create a layer of raw material. The actuator element may be coupled to member 176 using a holder (not shown) in any number of ways.

The process may use different raw materials 166 in the form of metal powder. Raw materials 166 may be provided to applicator 164 in a number of ways. In one embodiment, shown in FIG. 1, a stock of raw material 166 may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182, and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam 160, 162 source(s) 110, 112, 114, 116 to sequentially melt layers of metal powder on build platform 118 to generate AM component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 2:
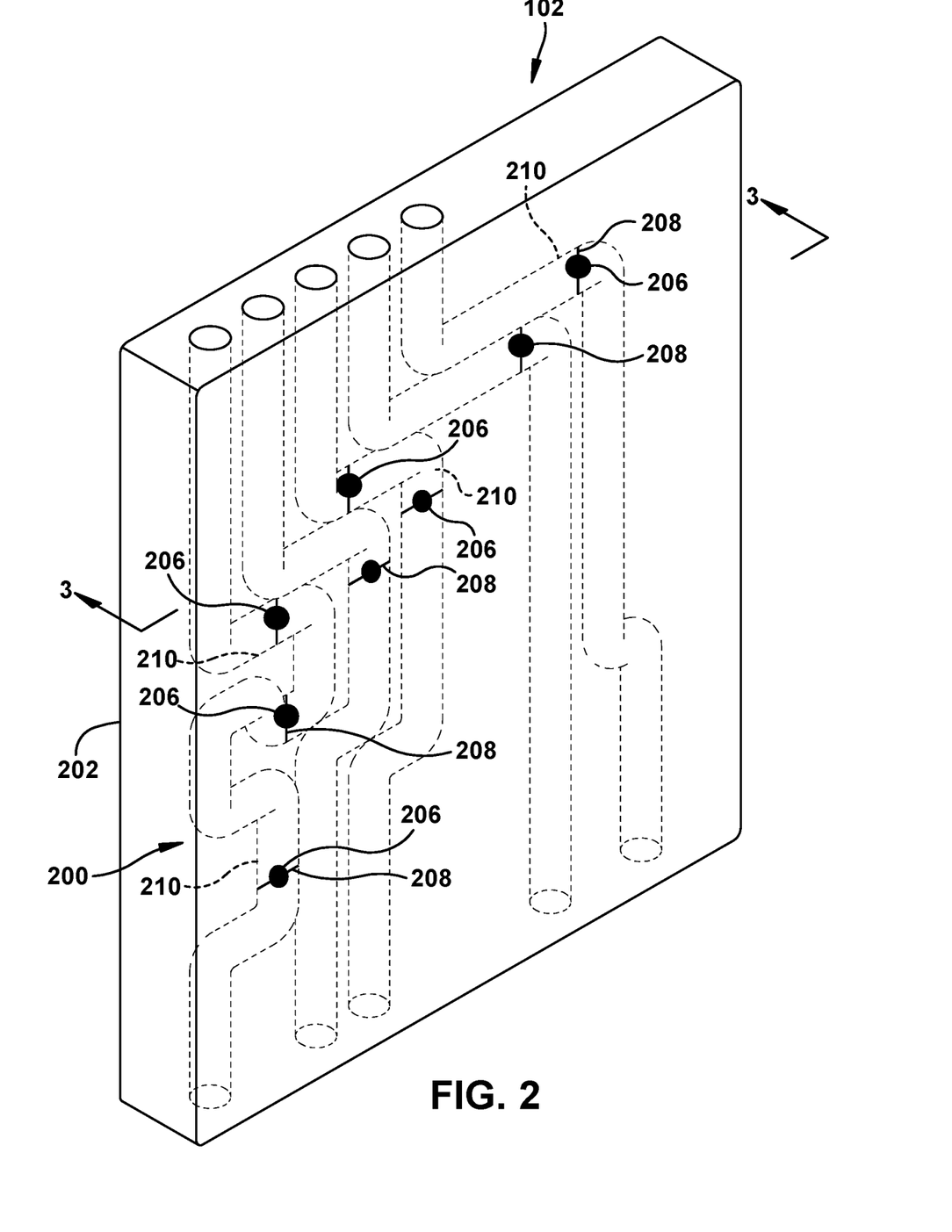
FIG. 2 shows a perspective view of an illustrative component in the form of a hot gas path (HGP) component to which methods of the disclosure may be applied.
Figure 3:
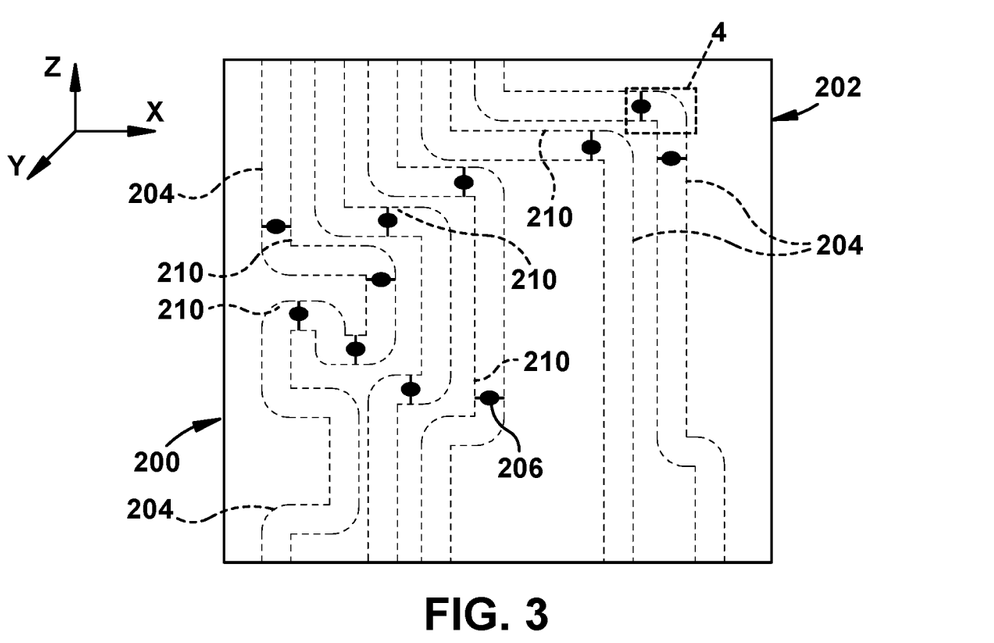
FIG. 3 shows a magnified lateral cross-sectional view of the illustrative component of FIG. 2 along line 3-3.
Figure 4:
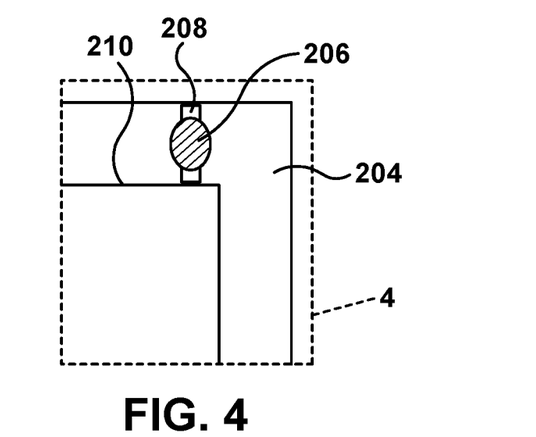
FIG. 4 shows a partial lateral cross-sectional view of an internal opening and shot peen element within the illustrative component.
Figure 5:
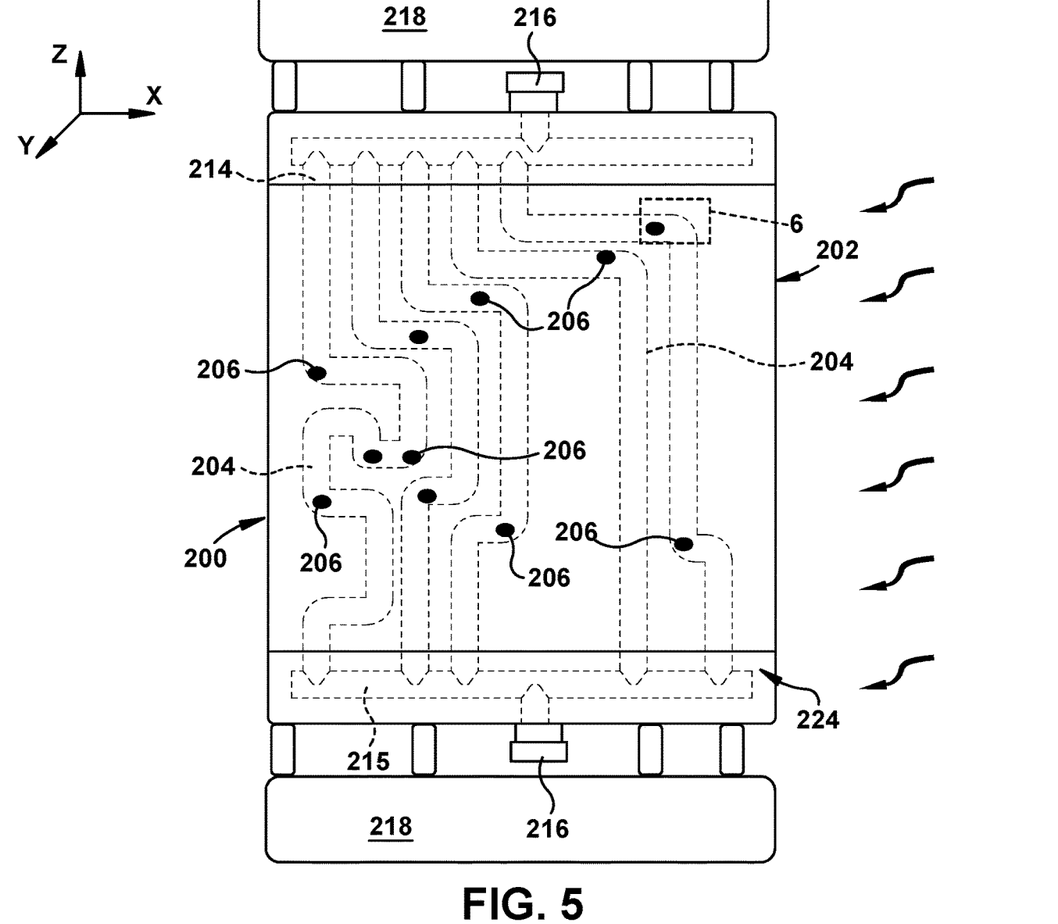
FIG. 5 shows a perspective view of an illustrative component in the form of a hot gas path (HGP) component undergoing processing according to embodiments of the disclosure.
Figure 6:
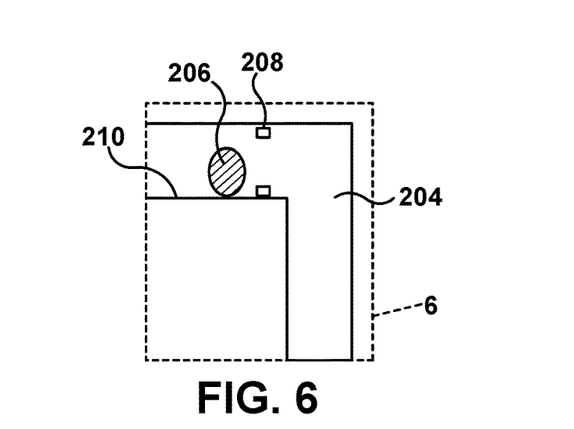
FIG. 6 shows a magnified lateral cross-sectional view of the illustrative component of FIG. 5 during processing according to embodiments of the disclosure.

FIGS. 2-6 show an example of an AM component 102 and accompanying methods according to the disclosure. FIGS. 2 and 5 show perspective views; FIG. 3 shows longitudinal cross-sectional views along line 3-3 in FIG. 2. FIGS. 4 and 6 show partial lateral cross-sectional views within region 4 of FIG. 3 and region 6 of FIG. 5, respectively.

AM component 102 may be made by any metal powder additive manufacturing process, such as that described relative to FIG. 1. AM component 102 may be made using any of the above-described metal powders. AM component 102 includes a body 200 which may have any shape, but is shown in the shape of a rectangular cuboid in the example depicted in FIGS. 2-6. In one example, AM component 102 may be any form of hot gas path (HGP) component such as a turbomachine blade or nozzle, but such application is not necessary. Body 200 has an external surface 202 and an internal opening(s) 204 passing at least partially through body 200. In the drawings, internal opening(s) 204 is shown as a cooling channel. As used herein, however, "internal opening" indicates any opening within body 200 of an AM component 102 including but not limited to a channel, passage, a cavity and/or a void.

Referring to FIGS. 2-4, with FIG. 4 providing an expanded cross-sectional view of internal opening(s) 204, one or more internal opening(s) 204 may include shot peen elements 206 formed therein. Each shot peen element 206 may be mechanically coupled to ligaments 208 for connecting each shot peen element 206 to an interior surface 210 of internal opening(s) 204. Shot peen elements 206 and/or ligaments 208 may be formed from the same metal powder additive manufacturing process used to form AM component 102, and thus may be included as part of object code 124O and/or other design specifications for AM 102. As shown specifically in FIG. 3, one or more shot peen element(s) 206 may be positioned within a corner or turn of internal opening(s) 204, e.g., due to such regions of an opening having a greater sensitivity to cracking or greater need for compressive stress. Shot peen element(s) 206 and ligament (s) 208 may be formed from, e.g., a nickel-based gamma prime hardened superalloy, a cobalt-based gamma prime hardened superalloy, and/or various other metallic substances discussed herein regarding the composition of AM component 102. According to further examples, shot peen element(s) 206 may be formed of metals or other materials not included in the composition of AM component 102. In such cases, shot peen element(s) 206 may be built separately from AM component 102, and placed within AM component 102 by being loaded into internal opening(s) 204 by a user, external device, etc., until the desired number and/or type of shot peen element(s) 206 are placed inside AM component 102. According to other examples, shot peen element(s) 206 may have a variety of material compositions, such that some shot peen element(s) 206 are built with AM component 102 while other shot peen element(s) 206 are manufactured separately and placed inside internal opening(s) 204.

Each shot peen element 206 within internal opening(s) 204 may be shaped to induce residual compressive stress upon contact with surface(s) 210 of internal opening(s) 204, e.g., while AM component 102 is vibrated, e.g., via mechanical instruments, ultrasonic pulses, and/or other components for imparting vibrations as discussed elsewhere herein. According to a first example, each shot peen element 206 may take the form of a substantially spheroidal body having a diameter less than that of internal opening(s) 204, e.g., approximately less than approximately 2.5 centimeters (cm) for internal openings 204 with a diameter of approximately 10.0 cm. It is understood that larger size or smaller size shot peen elements 206 may be used in larger size and smaller size internal openings 204, respectively, to vary the amount of compressive stress induced upon contact between shot peen element(s) 206 and surfaces 210 of internal opening(s) 204. Ligaments 208 may have a greatly reduced size (e.g., 10% or less of total volume) as compared to their corresponding shot peen elements 206, thereby creating a destructible attachment structure, support, etc., for selective detachment of shot peen elements 206. For instance, if shot peen element(s) 206 have a diameter of approximately 2.5 cm, ligament(s) 206 may have a diameter of approximately, e.g., 5 millimeters (mm). Various procedures for breaking, destroying, or otherwise removing ligament(s) 206 to detach shot peen element(s) 208 are discussed by example elsewhere herein.

As shown specifically in FIGS. 2 and 3, any number of internal openings 204 may be present in AM component 102, and shot peen elements 206 in various embodiments of the disclosure can be applied to any number of internal opening(s) 204 individually or collectively. In one embodiment, internal opening(s) 204 includes a cooling channel and is within, in one example, 0.3 to 3.0 millimeters (mm) of external surface 202 of body 200, and in another example, 0.3 to 0.8 mm of external surface 202 of body 200. However, where internal opening(s) 204 are cooling channels, any distance to ensure cooling during operation of component 102 will suffice. It is emphasized however that such close proximity to external surface 202 is not necessary to benefit from the teachings of the disclosure.

Referring now to FIGS. 5 and 6 together, methods according to the disclosure may include, e.g., detaching shot peen element(s) 206 from internal opening(s) 204 (e.g., by removing ligaments 208), and vibrating AM component 102 at a particular frequency after shot peen element(s) 206 are detached. Where applicable, embodiments of the disclosure may include using additional structures of AM component 102 to retain shot peen element(s) 206 within internal opening(s) 204. To this extent, opposing ends of each internal opening 204 may be connected to respective internal manifolds 214, 215 (FIG. 5 only) (also known as connector conduits) within body 200 for providing a fluid connection between each internal opening 204 and the exterior of AM component 102. In various alternative embodiments discussed elsewhere herein, internal manifolds 214, 215 may be substituted for a pair of external manifolds 222, 224 (FIGS. 10, 11) mounted externally on body 200 of AM component 102. In this case, the disclosure may include coupling one or more plugs 216 (FIG. 5 only) to internal manifold(s) 214, 215 to prevent shot peen element(s) 206 from escaping body 200 of AM component 102. According to an example, plug(s) 216 may take the form of a stopper, filter, valve, fluid seal material, and/or other currently-known or later-developed structure for preventing all or a selected group of materials (e.g., shot peen element(s) 206) from escaping body 200 of AM component 102.

Methods of the disclosure may include detaching shot peen element(s) 206 from body 200 of AM component 102, before shot peen element(s) 206 are used to impart stress against surface(s) 210 of internal opening(s) 204. According to one example, shot peen elements 206 may become detached from respective sets of ligaments 208 during the continued manufacture of AM component 102, e.g., due to other portions of AM component 102 increasing the force, pressure, etc., applied against ligaments 208 by other structural elements. External machinery and/or treatments may also be used to detach shot peen element(s) 206 from ligament(s) 208. For instance, a vibrating assembly 218 may impart mechanical vibrations on body 200 of AM component 102 at a particular frequency, and with a predetermined amount of mechanical force sufficient to detach shot peen element(s) 206 from their ligament(s) 208. In other cases, e.g., where ligament(s) 208 are designed to degrade, melt, etc., at elevated temperatures, a user may apply heat to external surface 202 (FIGS. 2, 3) of body 200 to detach shot peen element(s) 206 from surface(s) 210. It is also understood that any of the above-noted techniques may be used together where desired and applicable, or combined with other methodologies for detaching shot peen element(s) 206 by breaking ligament(s) 208.

As noted elsewhere herein, methods according to the disclosure may include imparting mechanical vibrations against AM component 102, e.g., at body 200. The imparting of mechanical vibrations at a particular frequency may occur after shot peen element(s) 206 become dislodged from ligament(s) 208, and/or may cause shot peen element(s) 206 to detach from ligament(s) 208. In any case, AM component 102 may be placed within or otherwise mechanically coupled to vibrating assembly 218 which may operate using an internal and/or external vibratory drive mechanism. However embodied, vibrating assembly may be structured for attachment to body 200 and imparting of mechanical vibratory force thereto at particular surfaces, or in multiple directions. In some implementations, vibrating assembly 218 may take the form of, or otherwise include, a pneumatic motor configured to generate mechanical vibrations and/or other forms of movement using compressed air transmitted from, e.g., a fluid source. Vibrating assembly 218 can alternatively include, or be embodied as, an electric motor, combustion engine, ultrasonic vibrating mechanism, and/or other currently-known or later developed instruments for producing mechanical work.

Vibrating assembly 218 may impart mechanical vibrations to AM component 102, such that the detached shot peen element(s) 206 physically contact surface(s) 210 of internal opening(s) 204 during continued vibration of AM component 102, thereby inducing a compressive stress internally within AM component 102 at internal opening(s) 204. Before implementing methods of the disclosure, various amounts of tensile surface stress may be present within body 200 proximate surface 210 of internal opening 204. Conventionally, tensile surface stresses on the exterior of AM component 102 may be treated by conventional shot peening of external surface(s) 202 to impart a compressive stress therein, i.e., to convert the tensile residual surface stress into a compressive surface stress. Embodiments of the disclosure allow tensile stresses within internal opening(s) 204 at surface(s) 210 to be converted into compressive surface stress. As used herein, "converted" indicates a change in residual surface stress that reduces the impact thereof such as but not limited to at least lowering an amount of surface stress and, more likely, a transformation from one form of stress to another, e.g., tensile to compressive. As vibrating assembly 218 mechanically vibrates AM component 102, shot peen element(s) 206 may move in response to action by vibrating assembly 218, thus coming into contact with the various surfaces 210 within internal opening(s) 204. The size and shape of each shot peen element(s) 206 may be configured to convert tensile stresses at surface(s) 210 into compressive stress, thereby providing additional surface treatments to AM component 102. Shot peen element(s) 206 then may remain inside AM component 102 or may be purged subsequently from internal opening(s) 204 as discussed herein.

Figure 7:
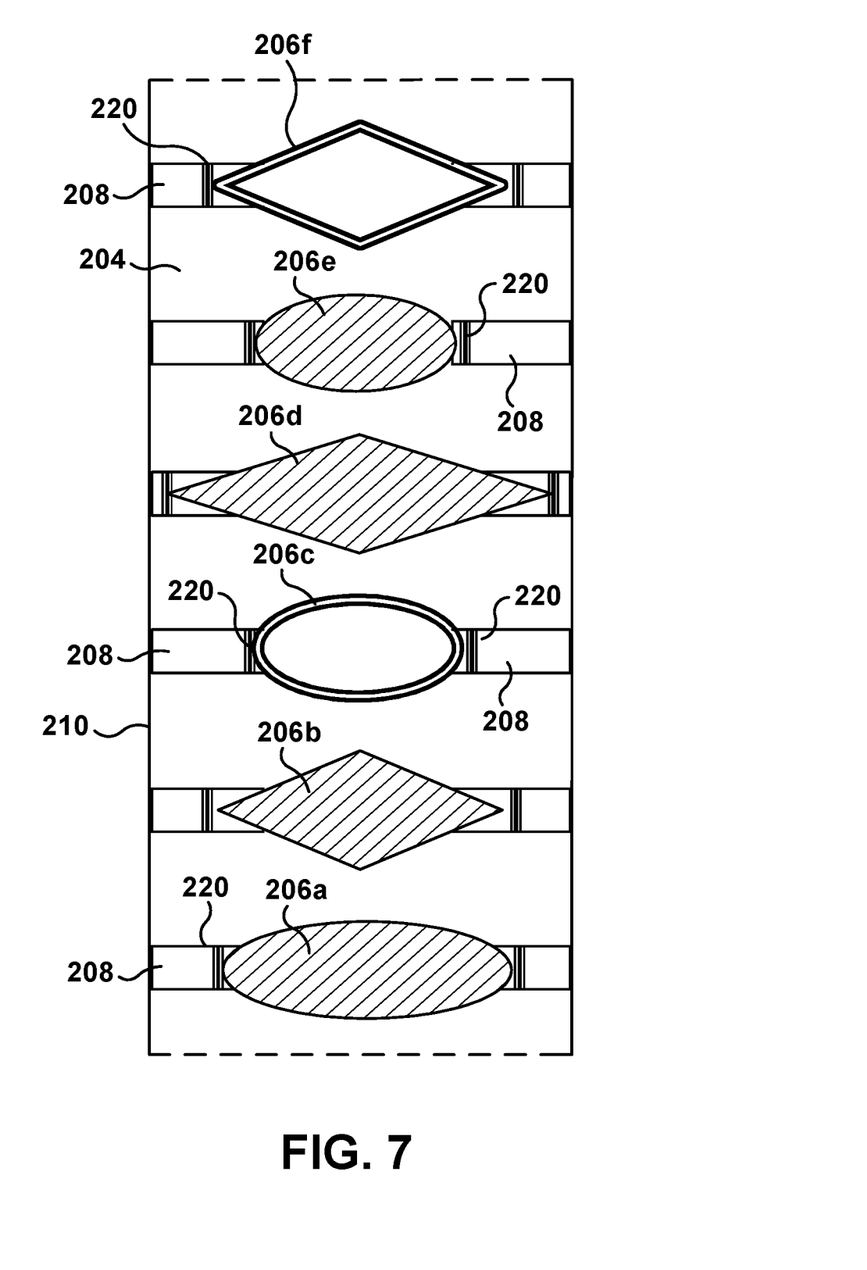
FIG. 7 shows a partial lateral cross-sectional view of multiple shot peen elements with different structural features according to embodiments of the disclosure.

Turning to FIG. 7, shot peen element(s) 206 may take a variety of forms, shapes, etc., to provide different amounts of compressive stress at surface(s) 210. Varying the shape and size of shot peen element(s) 206 may allow an operator to create different stress profiles, and/or otherwise adapt shot peen element(s) 206 to different internal openings 204. As an example, shot peen elements 206a, 206b, 206c, 206d, 206e, 206f in different sizes and shapes are shown in one internal opening 204, though it is understood that each of the various shapes may be positioned in different internal openings 204 and/or AM components 102 (FIGS. 1-6). According to various embodiments, some shot peen element(s) 206a, 206b, 206c, 206d, 206e, 206f may exhibit a substantially solid geometry without internal openings therein. By contrast, other shot peen element(s) 206c, 206f may include a hollow interior, e.g., to provide lower inertia or increase the maneuverability of shot peen element(s) 206 as AM component 102 is vibrated with vibrating assembly 218 (FIG. 5).

Further variation between shot peen element(s) 206 may include, e.g., shot peen element(s) 206a, 206c, 206e exhibiting a substantially rounded geometry such as a substantially circular shape, an ovular shape, etc., while other shot peen element(s) 206b, 206d, 206f may exhibit a substantially polygonal shape such as a cuboid or other polyhedral profile with a particular number of faces, edges, and vertices. The inclusion of substantially rounded shot peen element(s) 206a, 206c, 206e and/or substantially polygonal 206b, 206d, 206f may be selected based on whether surface contact between shot peen element(s) 206 and surface(s) 210 along a particular plane or profile of contact, a particular amount of stress, etc., is desired for a given AM component 102. It is emphasized that some shot peen element(s) 206 may exhibit both substantially rounded and substantially polygonal surfaces, partially solid and partially hollow interiors, etc., according to any conceivable combination and/or as appropriate for manufacture or use in one internal opening 204.

In addition to varying the configuration of shot peen element(s) 206, embodiments of the disclosure may also include forming a breakable region 220 within one or more ligament(s) 208. Breakable region 220 may generally provide a location of weakened structural integrity to aid in detaching shot peen element(s) 206 from ligament(s) 208 prior to, or during, the vibration of AM component 102 with vibrating assembly 218 (FIG. 5). In some cases, breakable region 220 may be provided as a portion of ligament 208 with a narrower surface area, and/or a section along ligament 208 that is most susceptible to material separation by application of heat, external force, etc. The location of breakable region(s) 220 on each ligament 208 may depend at least partially on the corresponding configuration of shot peen element(s) 206, and or the size of each internal opening 204. In any case, portions of ligament(s) 208 located between breakable region 220 and surface(s) 210 of internal opening 204 may remain in place after shot peen element(s) 206 have been detached, or may separately be removed during a subsequent vibrating and/or purging process. In some cases, a single ligament 208 may include multiple breakable regions 220, e.g., for also allowing ligament(s) 208 to be detached from surface(s) 210 of internal opening 204. According to one or more embodiments, breakable regions 220 may be shaped to break during continued manufacture of AM component 102, e.g., due to later-formed portions of a structure applying additional material strength against surface(s) 210 with ligament(s) 208 attached thereto.

Figure 8:
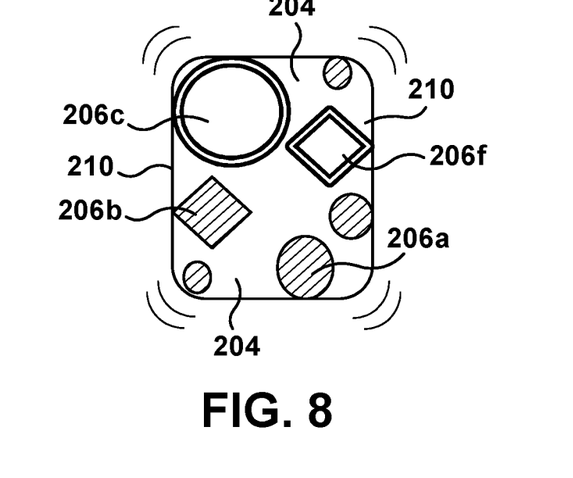
FIG. 8 shows a partial longitudinal cross-sectional view of an internal opening with dislodged shot peen elements during vibration according to embodiments of the disclosure.

Referring to FIG. 8, the interaction between shot peen element(s) 206 and surface(s) 210 of internal opening is shown to illustrate the imparting of compressive stress. As shown in the cross-section of FIG. 8, internal opening 204 is undergoing a vibration applied, e.g., by vibrating assembly 218 at a particular frequency. At this point, shot peen element(s) 206 have been dislodged from surface(s) 210 of internal opening 204, and have moved into forcible contact with surface(s) 210 of internal opening 204. The forcible contact between shot peen element(s) 206 and surface(s) 210 of internal opening(s) 204 will cause shot peen element(s) 206 to impart a compressive stress against surface(s) 210 of internal opening(s) 204. Where multiple shot peen element(s) 206 are included in a single internal opening 204, each shot peen element 206 may contact a particular surface 210 and/or different portions of the same surface 210. The continued application of vibrations may allow various shot peen element(s) 206 to forcibly contact several surfaces 210 of one internal opening 204, or otherwise provide repeated contact between shot peen element(s) 206 and surface(s) 210. As a result, the applying of compressive stress may be distributed throughout different regions and surface(s) of one internal opening 204.

Figure 9:
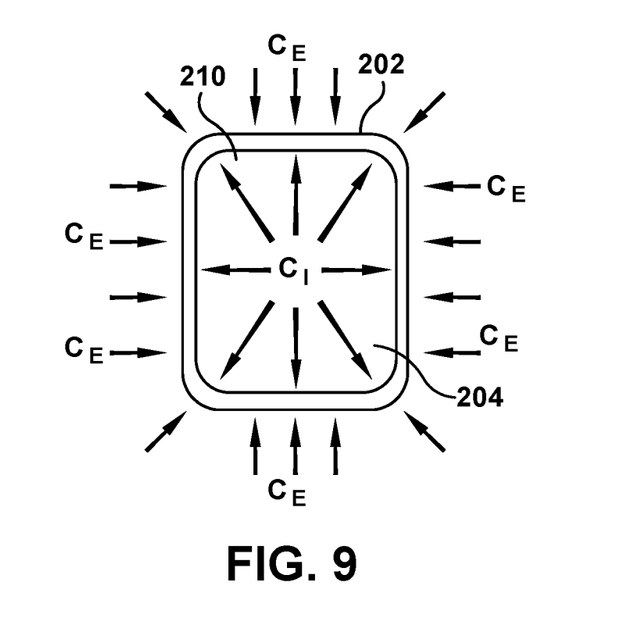
FIG. 9 shows a schematic longitudinal force-diagram of the internal opening of the illustrative component during vibration of a component according embodiments of the disclosure.

Referring briefly to FIG. 9, an illustrative force vector diagram for internal opening 204 during the vibrating illustrated in FIGS. 5 and 8 is shown. The vibrating of AM component 102 (FIGS. 1-6) may be concurrent with shot peening (e.g., shot peening 280 shown in FIG. 12), various forms of cold work treatment, and/or other currently known or later developed processes for applying compressive stress to external surface 202 of AM component 102. The applying of compressive stress to external surface 202 is illustrated by force vectors $C_E$ acting on external surface 202. The applying of compressive stress within internal opening 204 is shown by force vectors $C_I$ acting against surface(s) 210, and is in substantial opposition to force vectors $C_E$. Thus, FIG. 9 illustrates how embodiments of the disclosure may be operable to apply compressive stress within internal opening 204 at the same time as applying compressive stress, and/or other types of treatments, to external surface 202 of AM component 102.

Figure 10:
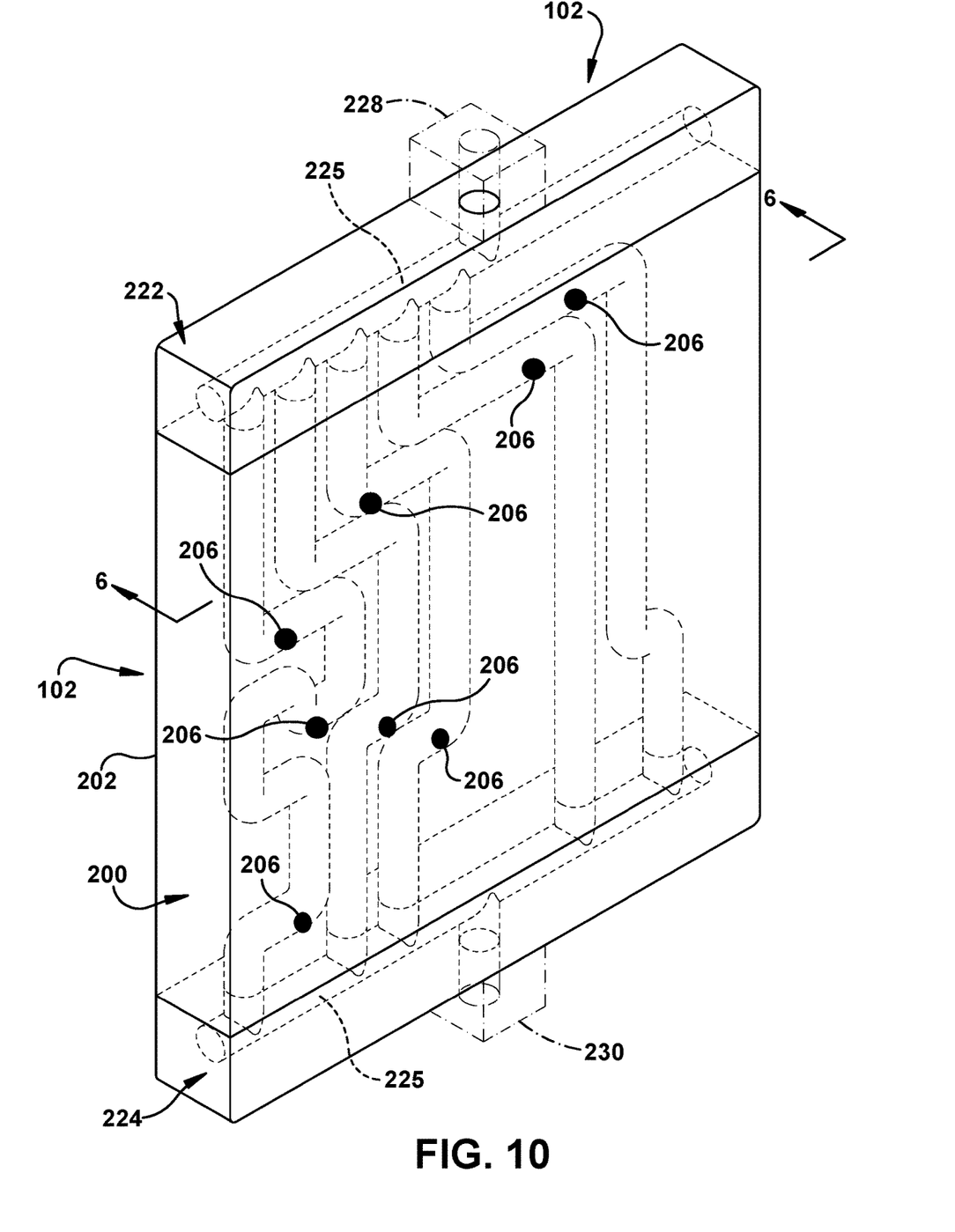
FIG. 10 shows a partial lateral cross-sectional view of positioning external manifolds on the illustrative component according to embodiments of the disclosure.

Referring now to FIG. 10, various components for removing shot peen element(s) 206 from internal opening(s) 204 after imparting compressive stress against surface(s) 210 are discussed. To remove shot peen element(s) 206, plug(s) 216 (FIG. 5) and vibrating assembly 218 (FIG. 5) first may be removed and/or decoupled from body 200 of AM component 102. In one embodiment after additive manufacture, internal manifolds 214, 215 may be included within or otherwise coupled to structures configured for collective removal of unused metal powders and/or other materials (e.g., shot peen elements 206, broken ligaments 208, etc.) from internal opening(s) 204 according to embodiments of the disclosure. As will be described, internal manifolds 214, 215 may be used for collective removal of various debris, unused metal powder, and/or other materials from internal opening(s) 204, e.g., using pressurized air in a conventional fashion, after shot peen element(s) 206 have induced compressive stress against surface(s) 210 of internal opening(s) 204 according to embodiments of the disclosure. Once unused metal powder and other materials have been removed from internal opening(s) 204, various external components coupled to AM component 102, e.g., through manifolds 214, 215, may be removed if they are not intended to be part of AM component 102. Such components may be removed using any now known or later developed cutting process, e.g., electro-discharge machining (EDM), cutting wheel, etc. In other cases, manifolds 214, 215 and external fluid coupling elements used for purging shot peen element(s) 206 and/or other materials from AM component 100 may remain as part of AM component 102.

As shown, AM component 102 may include a pair of external manifolds 222, 224 for collective removal of shot peen element(s) 206 from internal opening(s) 204. External manifolds 222, 224 may be omitted in cases where body 200 of AM component 102 includes a pair of internal manifolds 214, 215 (FIG. 5) as discussed elsewhere herein, with various components formed on and/or in connection with external manifolds 222, 224 being rearranged accordingly. As shown, manifolds 222, 224 may mate with internal opening(s) 204, and a common connector conduit 225 in each manifold 222, 224 may couple to each internal opening 204 of body 200. As will be described, manifolds 222, 224 may be used for collective removal of shot peen element(s) 206 from internal opening(s) 204, e.g., using pressurized fluids and/or other materials in a conventional fashion. Once shot peen element(s) 206 have been removed, manifolds 222, 224 may be removed, if they are not to be part of AM component 102. Manifolds 222, 224 may be removed using any now known or later developed cutting process, e.g., electro-discharge machining (EDM), cutting wheel, etc. As will be understood, manifolds 222, 224 may fluidly communicate with any desired internal opening(s) 204, e.g., those with shot peen element(s) 206 residing therein. It is emphasized that while particular structures such as manifolds 214, 215 (FIG. 6), 222, 224 (FIG. 7) have been described for removing shot peen element(s) 206 from internal opening(s) 204, a variety of alternative structures may be employed within the scope of the disclosure. The disclosure is not limited to any particular mechanism to remove shot peen element(s) 206 as described herein.

Figure 11:
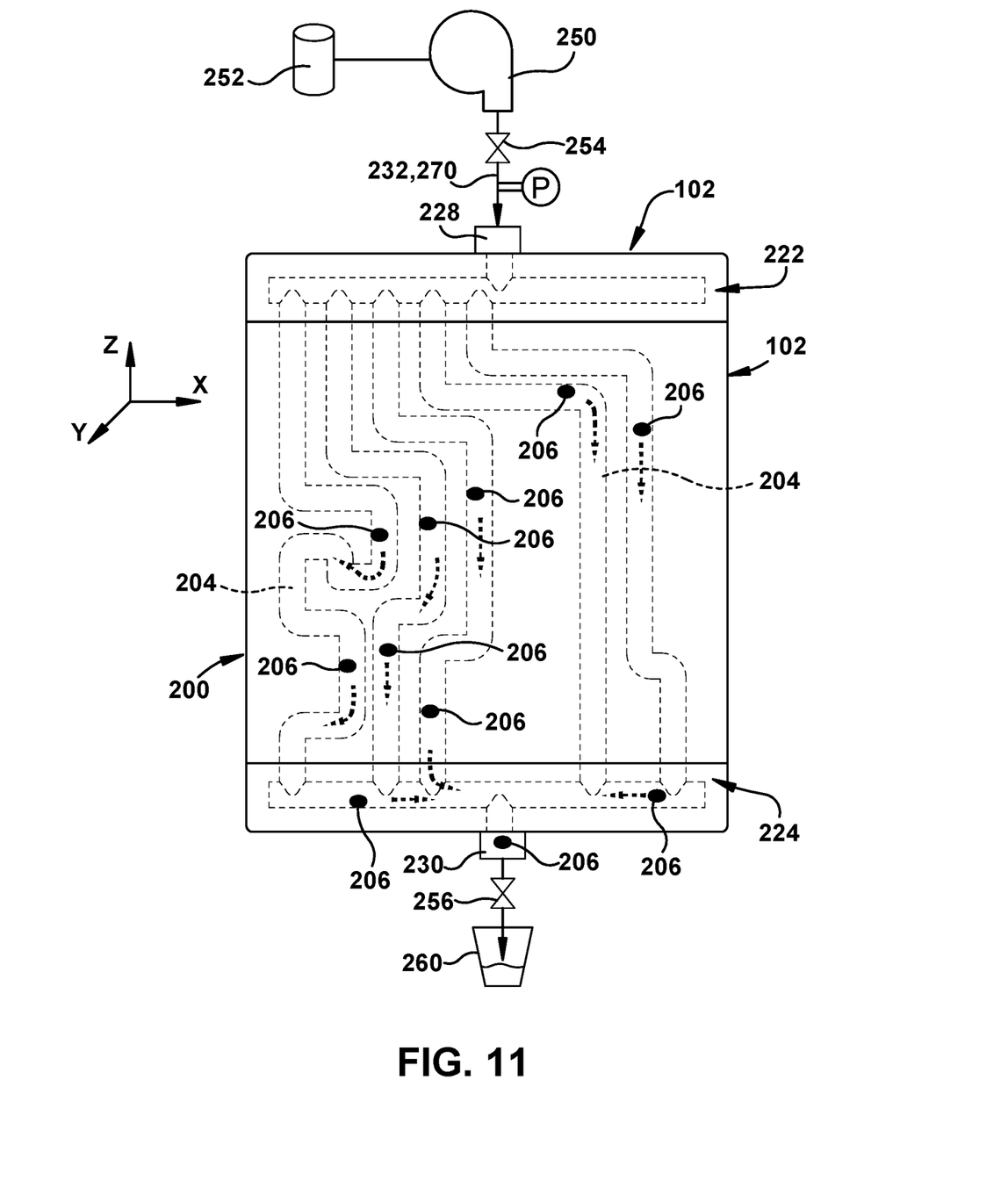
FIG. 11 shows a magnified lateral cross-sectional view of dislodged shot peen elements being purged from the illustrative component.

Referring to FIGS. 10 and 11 together, one or more ports 228, 230 may be built into manifolds 214, 215 (FIG. 6), 222, 224, and/or otherwise provided for fluid communication with one or more internal openings 204. Each external manifold 222, 224 may have a singular port 228, 230 feeding to common connector conduit 225 thereof. Ports 228, 230 may be male or female depending on what form of conduit is to be coupled thereto, e.g., from a compressor 250 or from a material recycling system 260. Ports 228, 230 may include any now known or later developed mechanism for sealingly delivering fluid 232 into internal opening(s) 204, e.g., threaded fasteners, snap-in-place sealing connectors, simple openings compatible with conduits having ends that sealingly couple thereto, etc. Ports 228, 230 can be provided as part of manifolds 222, 224, or otherwise provided after manifolds 222, 224 are formed, e.g., by threading into threaded ends (not shown).

In one embodiment, a compressor 250 may be fluidly coupled to one of manifolds 222, 224, e.g., at one port 228, 230, and a source 252 of fluid 232. Fluid 232 may include but is not limited to: water, an inert gas and/or air. Source 252 may include, for example, a tank, reservoir or other holding container appropriate for fluid 232. Compressor 250 can take any form capable of pressurizing one or more fluids as described herein, and may include, for example, a pump, a hydraulic or pneumatic ram, etc., depending on the form of fluid(s) 232 employed. Compressor 250 may be fluidly coupled to one of manifolds 222, 224 through a valve 254, e.g., using any desired type and/or number of fluid conduits. Similarly, the opposing manifold 222, 224 may include a valve 256 for controlling opening/closing of an opposing end of internal opening(s) 204, thus controlling whether fluids are permitted to flow therethrough, e.g., for purging of shot peen element(s) 206 to a recycling system 260, as will be described herein. In some instances, some shot peen element(s) 206 may remain within body 200 of AM component 102 while others are removed, e.g., based on the configuration of internal opening(s) 204. Compressor 250 may include any form of computerized controller (not shown) for accurate control thereof to generate pressurized fluid 232 according to embodiments of the disclosure. Compressor 250 may be operatively coupled to control system 120 of AM system 100 or have its own controller (not shown) in communication with control system 120 (FIG. 1).

To purge shot peen element(s) 206 from in internal opening(s) 204, valve 256 may be opened when pressure and/or fluids are being delivered through internal opening(s) 204. As a result, fluid(s) 232 can exit from one manifold 222, 224 to recycling system 260, carrying with it shot peen element(s) 206 (e.g., along the phantom arrows shown in FIG. 11). In this fashion, internal opening(s) 204 are at least initially purged of shot peen element(s) 206 with fluid 232, after the vibrating assembly 218 operates on body 200 of AM component 102. Subsequently, internal opening(s) 204 may optionally be further purged of shot peen element(s) 206 with, for example, a pressurized air flow 270 (created, e.g., from compressor 250), after initial purging by fluid 232. This latter purging may be performed after additive manufacture of AM component 102 concludes. In other cases, shot peen element(s) 206 may remain inside internal opening(s) 204 even after AM component 102 is deployed, placed into service, etc. In such cases, AM component 102 may be designed to operate while shot peen element(s) 206 are included therein, without any need for subsequent removal, purging, etc., of shot peen element(s) 206 from internal opening(s) 204.

Figure 12:
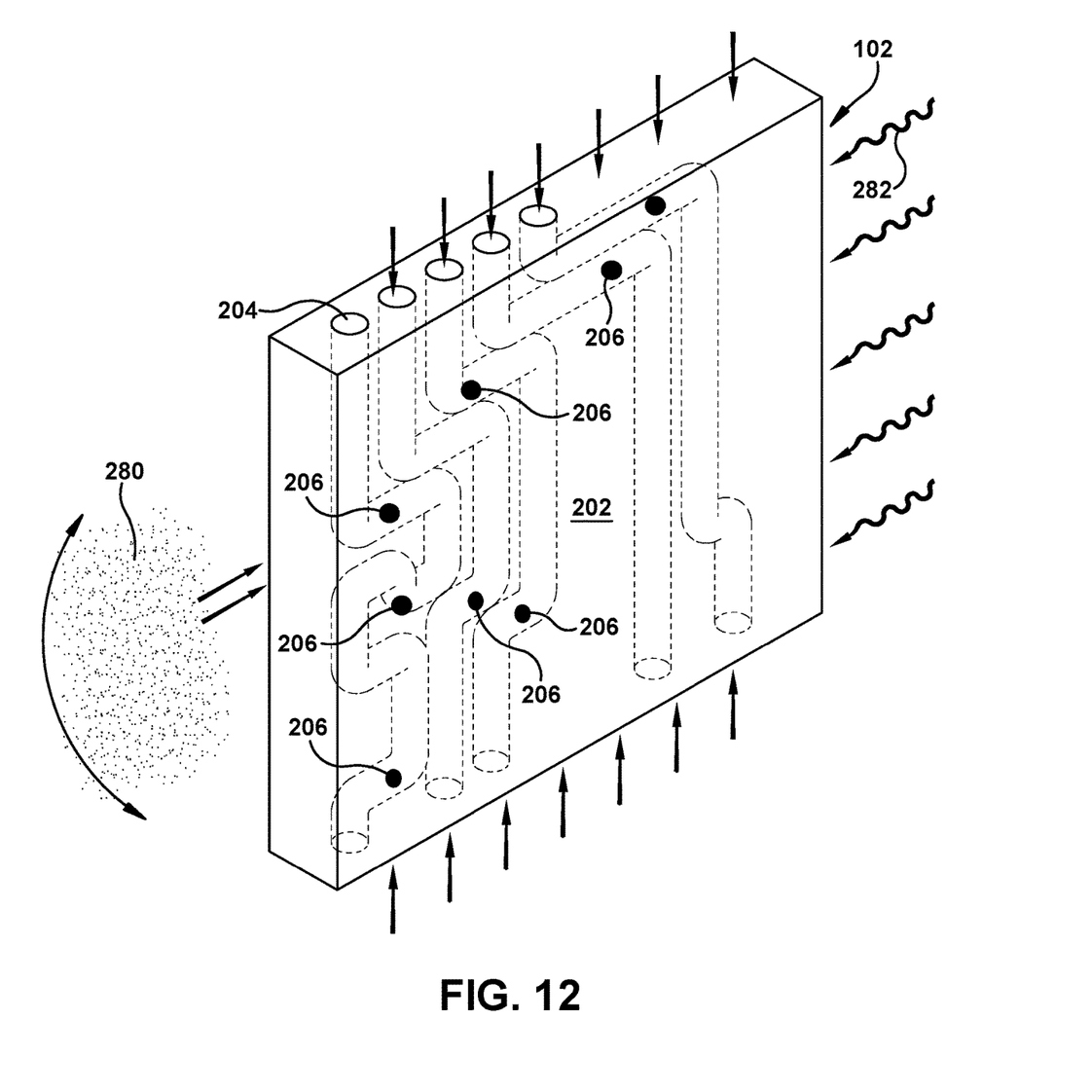
FIG. 12 shows a schematic perspective view of the illustrative component undergoing additional processing according to embodiments of the disclosure.

FIG. 12 shows a perspective view of AM component 102 collectively illustrating additional processes that may be performed on AM component 102 according to embodiments of the disclosure. As discussed elsewhere herein, embodiments of the disclosure may include, e.g., imparting compressive stress on external surface 202 of AM component 102 by shot peening 280 external surface 202. The application of shot peening 280 may be subsequent to and/or simultaneous with the vibrating of AM component 102 to impart compressive stress against internal opening(s) 204 with shot peen element(s) 206. Simultaneous treatment of external surface(s) 202 and internal opening(s) 204 of AM component 102 may reduce the time and costs of imparting both types of stress. Other techniques for imparting compressive stress to external surface(s) 202 of AM component 102 may include but are not limited to ultrasound, rolling or pressurizing.

Additional or alternative treatments of AM component 102 may include heat treating 282 AM component 102 before, during, or after the use of shot peen element(s) 206 as discussed herein. Heat treating 282 may include any now known or later developed heat treating appropriate for the material(s) of AM component 102. In some cases, heat treatment 282 of AM component 102 may also serve to detach shot peen element(s) 206 from internal opening(s) 204, e.g., by elevating the temperature of ligament(s) 208 (2-4, 7) above a material failure and/or melting point to detach shot peen element(s) 206.

The various processes described herein for imparting compressive stress to AM component 102, both internally and externally, are performable regardless of whether AM processes to from component 102 have concluded. That is, AM component 102 may be operated on by vibrating assembly 218 (FIG. 5), shot peening 280, heat treating 282, etc., while other portions of AM component 102 continue to undergo manufacture. In some cases as noted elsewhere herein, shot peen element(s) 206 may be configured for detachment from internal opening(s) 204 as a result of continued manufacture of AM component 102. Detaching shot peen element(s) 206 by continued manufacture of AM component 102 may be desirable to reduce the number or duration of other processes which may otherwise be used to detach shot peen element(s) 206 from internal opening(s) 206.

Returning to FIG. 2, in addition to the various methods provided herein, embodiments of the disclosure further include AM component 102 itself which includes body 200 having external surface 202 and internal opening(s) 204 passing through body 204. One or more ligaments 208 formed on surface(s) 210 of internal opening(s) 204 mechanically couple shot peen element(s) 206 to surface(s) 210 for use in imparting compressive stress within internal opening(s) 204. The manufactured AM component 102 thus may be operated on by the manufacturer and/or other entities to create a desired amount of stress by contact between shot peen element(s) 206 and surface(s) 210. Consequently, AM components 102 formed according to embodiments of the disclosure overcome the limited effectiveness of conventional shot peening for internal opening(s) 204, e.g., cooling channels and similar features, to prevent the occurrence of SAC for high gamma prima alloyed components during, e.g., a stress relief heat treatment after the DMLM process. Embodiments of the disclosure thus have the potential to yield crack-free high gamma prima alloyed AM components and also improve overall yield. Furthermore, the treatment will most likely result in higher mechanical properties especially for cyclic application.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
  receiving a component made by a metal powder additive manufacturing process, the component including a body having an external surface and an internal opening passing at least partially through the body, the internal opening including an additively manufactured shot peen element physically attached to an interior surface of the internal opening by at least one ligament, wherein the interior surface of the internal opening comprises one of a corner or a turn within the internal opening, each ligament including at least one frangible region, wherein the additively manufactured shot peen element is shaped to induce a residual compressive stress upon contact with the interior surface of the internal opening;
  breaking the at least one frangible region of the at least one ligament to physically detach the additively manufactured shot peen element from the interior surface of the internal opening of the body of the component; and
  vibrating the component at a selected frequency, wherein the additively manufactured shot peen element induces the compressive stress against the surface of the internal opening during the vibrating.

2. The method of claim 1, further comprising applying a compressive stress to the external surface of the component after the vibrating.

3. The method of claim 1, further comprising purging the additively manufactured shot peen element from the internal opening, after the vibrating.

4. The method of claim 3, further comprising:
  sealing the internal opening with the additively manufactured shot peen element therein, before the vibrating; and
  unsealing the internal opening after the vibrating, and before the purging of the additively manufactured shot peen element from the internal opening.

5. The method of claim 1, wherein the internal opening is within approximately 0.3 to 3.0 millimeters (mm) of the external surface of the body.

6. The method of claim 1, wherein the component includes one of a nickel-based gamma prime hardened superalloy or a cobalt-based gamma prime hardened superalloy.

7. A method comprising:
  manufacturing a component by a metal powder additive manufacturing process, the component including:
    a body having an external surface,
    an internal opening passing at least partially through the body, and
    an additively manufactured shot peen element having at least one ligament, each ligament physically attaching the additively manufactured shot peen element to an interior surface of the internal opening, wherein the interior surface of the internal opening comprises one of a corner or a turn within the internal opening, each ligament including at least one frangible region, and wherein the additively manufactured shot peen element is shaped to induce a residual compressive stress upon contact with the surface of the internal opening;

breaking the at least one frangible region of the at least one ligament to physically detach the additively manufactured shot peen element from the interior surface of the internal opening; and vibrating the component at a selected frequency, wherein the additively manufactured shot peen element induces the compressive stress against the interior surface of the internal opening during the vibrating.

8. The method of claim 7, further comprising continuing the metal powder additive manufacturing process for making the component simultaneously with the breaking of the at least one frangible region of the at least one ligament.

9. The method of claim 7, wherein the breaking of the at least one frangible region of the at least one ligament occurs during the vibrating of the component.

10. The method of claim 7, wherein the breaking of the at least one frangible region of the at least one ligament comprises applying a heat treatment to the component.

11. The method of claim 7, wherein a thickness of the ligament is at most approximately five millimeters (mm).

12. The method of claim 7, wherein the additively manufactured shot peen element includes one of a hollow body or a solid body.

13. The method of claim 7, wherein a surface profile of the additively manufactured shot peen element includes one of a substantially rounded geometry or a substantially polygonal geometry.

14. The method of claim 7, further comprising applying a compressive stress to the external surface of the component after the vibrating.

15. The method of claim 7, further comprising purging the additively manufactured shot peen element from the internal opening, after the vibrating.

16. The method of claim 15, further comprising:

sealing the internal opening with the additively manufactured shot peen element therein, before the vibrating; and unsealing the internal opening after the vibrating, and before the purging of the additively manufactured shot peen element from the internal opening.

17. A method comprising:

receiving a component made by a metal powder additive manufacturing process, the component including a body having an external surface and an internal opening passing at least partially through the body, the internal opening including an additively manufactured shot peen element physically attached to an interior surface of the internal opening by a plurality of ligaments, each ligament including at least one frangible region, wherein the additively manufactured shot peen element is shaped to induce a residual compressive stress upon contact with the interior surface of the internal opening;

breaking the at least one frangible region of the plurality of ligaments to physically detach the additively manufactured shot peen element from the interior surface of the internal opening of the body of the component; and vibrating the component at a selected frequency, wherein the additively manufactured shot peen element induces the compressive stress against the surface of the internal opening during the vibrating, wherein the interior surface of the internal opening comprises one of a corner or a turn within the internal opening.

* * * * *